No. 737,215. PATENTED AUG. 25, 1903.
W. FORKER.
DEHORNING IMPLEMENT.
APPLICATION FILED DEC. 17, 1902.
NO MODEL.
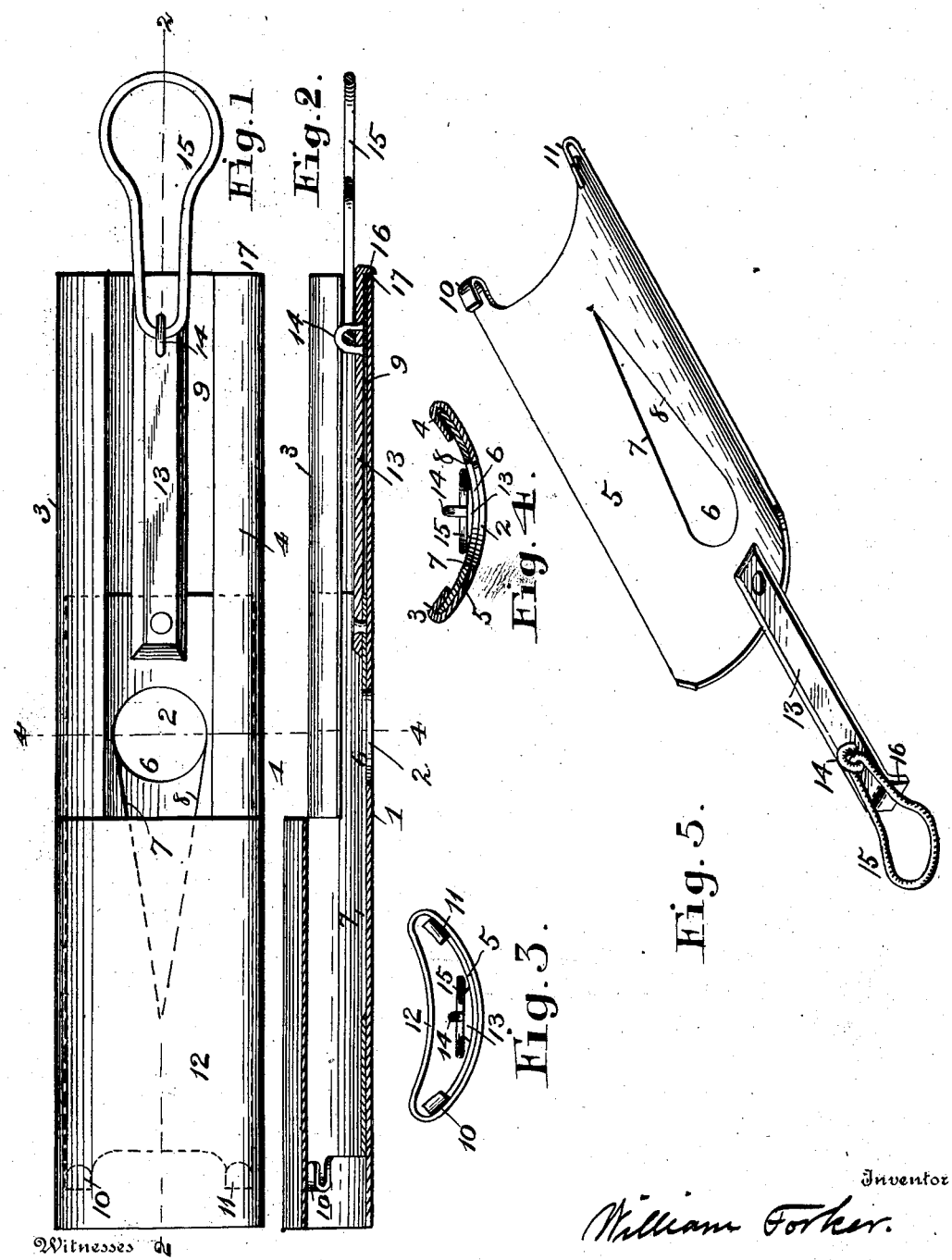
Witnesses
F. L. Ourand
W. Parker Reinohl
Inventor
William Forker.
By D. L. Reinohl
Attorney No. 737,215. Patented August 25, 1903.

UNITED STATES PATENT OFFICE.

WILLIAM FORKER, OF GLENWOOD SPRINGS, COLORADO.

DEHORNING IMPLEMENT.

SPECIFICATION forming part of Letters Patent No. 737,215, dated August 25, 1903.

Application filed December 17, 1902. Serial No. 135,519. (No model.)

*To all whom it may concern:*

Be it known that I, WILLIAM FORKER, a citizen of the United States, residing at Glenwood Springs, in the county of Garfield and State of Colorado, have invented certain new and useful Improvements in Dehorning Implements; and I do hereby declare the following to be a full, clear, and exact description of the invention, such as will enable others skilled in the art to which it appertains to make and use the same.

My invention relates to devices for dehorning cattle, has especial reference to the dehorning of calves or young cattle, has for its object the amputation of the horn as quickly, as readily, and with as little pain as possible, to provide a very simple, cheap, and durably-constructed device of the above class, the same being adapted for removing the horns of cattle without the danger of cracking or fracturing the same below the cut, so as to effectually destroy all further growth of the horns and prevent doing injury to one another or to other stock, and the invention consists in certain improvements in construction, which will be fully disclosed in the following specification and claims.

In the accompanying drawings, which form part of this specification, Figure 1 is a plan view of my device. Fig. 2 is a vertical longitudinal section on line 2 2, Fig. 1; Fig. 3, an end view; Fig. 4, a transverse section on line 4 4, Figs. 1 and 2; and Fig. 5, a detail perspective of the knife detached.

Reference being had to the drawings and the designating characters thereon, 1 indicates the outer casing of the device, which is concavo-convex in transverse section; 2, the opening through which the horn of the animal to be dehorned is placed. The casing 1 has its edges 3 4 bent over, so that they form flanges or guides for the longitudinally-reciprocating blade 5, having a slot 6 therein, with converging knife-edges 7 8. The upper side 9 of the casing also serves as a guide for the blade 5. The flanges or guides 3 4 extend back only far enough to engage the lugs 10 11 on the rear ends of the concavo-convex longitudinally-reciprocating blade 5, which prevents the blade from being pulled out of the casing 1.

A short distance beyond the opening 2 is a hood or covering 12, which is the length of the knife-edges and serves as a protection to the cutting edges of the knife and at the same time serves as a place of purchase for the hand of the operator to hold the device on the head of an animal.

To the blade 5 is attached an arm 13, through which is an eye 14, to which a ring or handle 15 is attached, by which the operator pulls or slides the blade backward or toward himself. On the under side of the arm 13 and at the outer end thereof is a lug 16, which engages the rear end of the casing 1 and causes the rear end of slot 6 to register with the opening 2 in the casing 1 and prevents the blade 5 from being pushed forward out of the casing 1, while the lugs 10 11 prevent the knife being withdrawn from the rear end of the casing as the horn of an animal is being amputated or severed.

To remove the blade 5 from the casing 1 for the purpose of cleaning it or sharpening the knife-edges, the operator pulls or raises the arm 13 up far enough to allow the lug 16 to pass the rear end 17 of the casing and pushes the blade out of the casing at the forward or front end.

In the operation of this device the animal is confined in a run or pen and its head fastened, so as to allow the operator to use the device without interference on the part of the animal by its efforts to escape. The device is placed so that the opening 2 in the casing 1 and the slot 6 in the blade 5 are over the horn to be amputated or severed. The operator with one hand holds the dehorning device at the front end and with the other hand pulls or slides the blade 5, with its knife-edges 7 8, rearward, so that they engage the soft horn, and as the blade 5 is pulled rearward the knife-edges 7 8 cut through the horn and sever it close to the skull of the animal. After the horn has been severed the blade 5 is pushed back to its normal position and is ready for the next operation.

The device, it will be readily seen, is durable and can be made very cheaply, is much lighter in weight, and in its use is much more humane than the bulky crushing devices in common use.

Having thus fully described my invention, what I claim is—

1. A dehorning device consisting of an outer casing having an opening therein to receive a horn, and the upper edges of which casing are bent to form guides, and a hood at the front end of the casing forming a handle for the operator; in combination with a reciprocatory blade provided with projections engaging the casing.

2. A dehorning device consisting of an outer casing having an opening therein to receive a horn, guides on the upper side, and a hood at one end and forming an integral part thereof; in combination with a reciprocatory blade having lugs on its front end to limit the backward movement of the blade.

3. A dehorning device consisting of a concavo-convex casing having an opening therein to receive a horn, guides for the blade, and a hood at one end and forming part of the casing; in combination with a concavo-convex reciprocatory blade having a slot therein provided with knife-edges, and means on the blade for limiting its movement in both directions.

4. In a device for dehorning cattle, a concavo-convex sheet-metal casing having an opening therein to receive a horn, and guides on the upper side, integral therewith and bent inward and downward; in combination with a concavo-convex reciprocatory blade engaging said guides, and means on the blade for limiting its movement in both directions.

5. A dehorning device consisting of an outer casing having an opening therein, guides on its upper side, a reciprocatory blade having lugs on its front end, and an opening having converging knife-edges therein.

6. A dehorning device consisting of an outer casing having an opening therein, guides on its upper side, a reciprocatory blade having lugs on its front end to engage said guides, an opening having converging knife-edges therein, and an arm having a lug on its under side for limiting the forward movement of the blade.

7. A dehorning device consisting of an outer casing having an opening therein, guides on its upper side, a reciprocatory blade having lugs on its front end limiting the rearward movement of the blade, an opening in the blade having knife-edges therein, and an arm having a lug on its under side limiting the forward movement of the blade; in combination with a handle for operating the blade.

In testimony whereof I affix my signature in presence of two witnesses.

WILLIAM FORKER.

Witnesses:
  LOUIS SCHWARZ,
  E. J. SCHRINEK.